(12) United States Patent  
Catlin

(10) Patent No.: US 7,525,212 B1  
(45) Date of Patent: Apr. 28, 2009

(54) OCEAN POWER HARVESTER

(76) Inventor: Chris S Catlin, 3619 Sweetwater Canyon Dr., Malibu, CA (US) 90265

( * ) Notice: Subject to any disclaimer, the term of this patent is extended or adjusted under 35 U.S.C. 154(b) by 91 days.

(21) Appl. No.: 11/451,717

(22) Filed: Jun. 13, 2006

Related U.S. Application Data

(60) Provisional application No. 60/692,220, filed on Jun. 20, 2005.

(51) Int. Cl.
- F03B 13/10 (2006.01)
- F03B 13/12 (2006.01)
- H02P 9/04 (2006.01)

(52) U.S. Cl. ........................................ 290/53
(58) Field of Classification Search .................... 290/53
See application file for complete search history.

(56) References Cited

U.S. PATENT DOCUMENTS

| | | | | |
|---|---|---|---|---|
| 430,790 | A * | 6/1890 | Starkenberg | 405/76 |
| 1,507,461 | A | 9/1924 | Chase | 405/26 |
| 1,551,113 | A | 8/1925 | Olsson | 417/332 |
| 3,687,567 | A | 8/1972 | Lininger | 415/7 |
| 3,965,679 | A | 6/1976 | Paradiso | 60/398 |
| 3,983,404 | A | 9/1976 | Sherrard | 290/53 |
| 4,013,379 | A * | 3/1977 | Bolding | 417/100 |
| 4,078,871 | A * | 3/1978 | Perkins, Jr. | 417/100 |
| 4,172,689 | A * | 10/1979 | Thorsheim | 415/7 |
| 4,179,886 | A | 12/1979 | Tsubota | 60/398 |
| 4,210,821 | A * | 7/1980 | Cockerell | 290/53 |
| 4,216,655 | A * | 8/1980 | Ghesquiere | 60/398 |
| 4,263,516 | A * | 4/1981 | Papadakis | 290/53 |
| 4,398,095 | A * | 8/1983 | Ono | 290/53 |
| 4,454,429 | A * | 6/1984 | Buonome | 290/53 |
| 4,521,152 | A * | 6/1985 | Henrikson | 415/4.1 |
| 4,540,313 | A * | 9/1985 | Broome | 405/78 |
| 4,746,244 | A * | 5/1988 | Broome | 405/78 |
| 4,815,286 | A * | 3/1989 | Watanabe | 60/398 |
| 5,009,568 | A * | 4/1991 | Bell | 415/3.1 |
| 5,027,000 | A * | 6/1991 | Chino et al. | 290/53 |
| 5,027,735 | A * | 7/1991 | Labrador | 114/39.26 |
| 5,052,902 | A * | 10/1991 | Labrador | 417/330 |
| 5,375,550 | A * | 12/1994 | Innis | 114/267 |

(Continued)

FOREIGN PATENT DOCUMENTS

JP 58070067 4/1983

(Continued)

*Primary Examiner*—Julio Gonzalez  
*Assistant Examiner*—Pedro J Cuevas  
(74) *Attorney, Agent, or Firm*—Cislo & Thomas LLP; Kelly W. Cunningham, Esq.

(57) ABSTRACT

An improved ocean energy converter having a semi-submerged device designed to harvest energy from the ocean. Each device is connected to others to form long lines forming an interconnected array of ocean energy devices that are anchored at right angles to the prevailing ocean waves. The front and back sections of each energy module have internal ballast. Each device has a submerged inverse curved wing sections attached to floating stabilizer tubes. The trailing edge of the wings has several struts attached which support propellers that drive internal air compressors. The air compressors are connected together and connected to the other air compressors in the array of devices and those in turn are connected to a high pressure line leading underwater to an onshore air turbine electric generator connected to the local power grid.

18 Claims, 4 Drawing Sheets

U.S. PATENT DOCUMENTS

| | | | | |
|---|---|---|---|---|
| 5,443,361 | A | 8/1995 | Skaarup | 415/3.1 |
| 5,461,862 | A * | 10/1995 | Ovadia | 60/641.9 |
| 5,664,418 | A * | 9/1997 | Walters | 60/398 |
| 5,946,909 | A | 9/1999 | Szpur | 60/398 |
| 6,194,791 | B1 * | 2/2001 | Wells | 290/53 |
| 6,527,504 | B1 * | 3/2003 | Skaarup | 415/3.1 |
| 6,647,716 | B2 * | 11/2003 | Boyd | 60/398 |
| 6,922,993 | B2 * | 8/2005 | Kemp | 60/495 |
| 6,954,006 | B2 * | 10/2005 | Williams, Jr. | 290/54 |
| 6,968,683 | B2 * | 11/2005 | Shields | 60/398 |
| 7,084,521 | B1 * | 8/2006 | Martin | 290/54 |
| 7,144,197 | B2 | 12/2006 | Black | 405/79 |
| 7,262,517 | B1 * | 8/2007 | Srybnik et al. | 290/54 |
| 2008/0088132 | A1 * | 4/2008 | Laube von Laubenfels | 290/53 |
| 2008/0093589 | A1 * | 4/2008 | Catlin | 290/54 |
| 2008/0093852 | A1 * | 4/2008 | Vowles et al. | 290/42 |
| 2008/0122224 | A1 * | 5/2008 | Van Berkel | 290/42 |

FOREIGN PATENT DOCUMENTS

| | | |
|---|---|---|
| JP | 2001172950 | 6/2001 |
| WO | WO 96/00848 | 1/1996 |

* cited by examiner

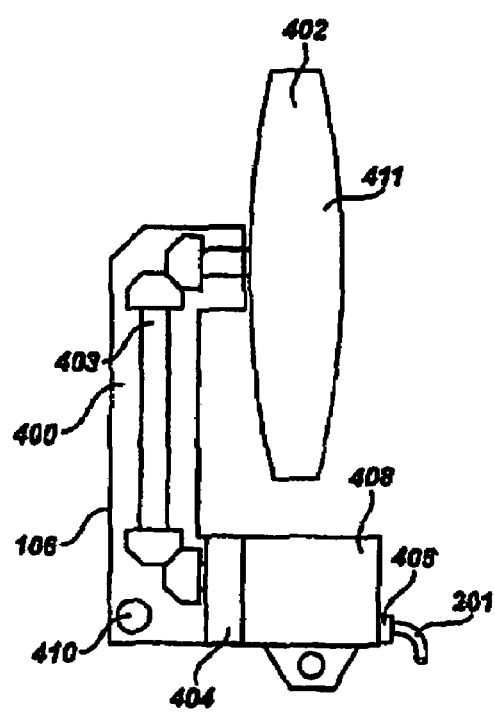 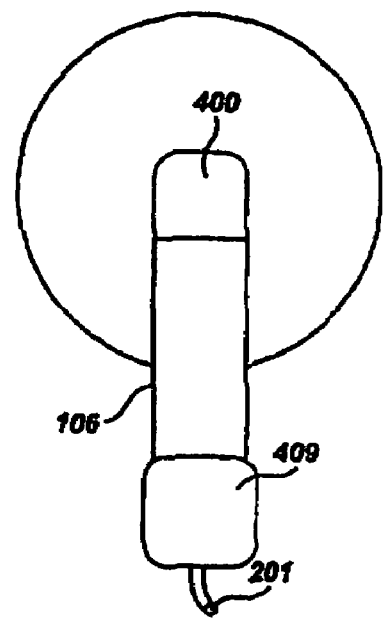
Fig. 5  Fig. 6

OCEAN POWER HARVESTER

CROSS-REFERENCE TO RELATED APPLICATIONS

This application claims the benefits of PPA Ser. No. 60/692,220, filed Jun. 20, 2005 by the present inventor.

FEDERALLY SPONSORED RESEARCH

Not Applicable

SEQUENCE LISTING OR PROGRAM

Not Applicable

BACKGROUND OF THE INVENTION

1. Field of Invention

This invention relates to the field of energy, specifically to a device that can produce mechanical and electric energy from ocean wave sources with maximum efficiency, minimum cost and maintenance without producing any greenhouse gases (GHG) emissions, directly or indirectly.

2. Prior Art

The Industrial Age began little more than 150 years ago powered primarily by wood, coal and petroleum. Today, our energy economy seems to be humming along like a perpetual motion machine. Billions of people enjoy an unprecedented standard of living and nations are floating in rivers of wealth, in large part because, around the world, the energy industry has built an enormous network of oil wells, supertankers, pipelines, coal mines, power plants, transmission lines, cars, trucks, trains and ships—a gigantic, marvelously intricate system that almost magically converts oil and its hydrocarbons cousins, natural gas and coal, into the heat, power and mobility that animate modern civilization. For one hundred years this manmade wonder has performed nearly flawlessly, transforming coal, oil, and natural gas into economic and political power and turning the belief that the surest way to still greater prosperity and stability is simple: find more oil, coal and natural gas. Today, cheap petroleum, with its high power density and transportability, has become the premier energy choice and the foundation of our comfortable and mobile life style.

Now globalization is pushing mankind into the future, the escalation of quality of life for billions, meaning more energy and food consumption and pollution and disease. But it is being challenged by a sobering reality: global population in 1800 was 1 billion, it doubled by 1925, then doubled again to 4 billion by 1975 and grew to 6 billion in the year 2000. We are entering a new century where we are facing the consequences of our almost total reliance on a single energy source. A crunch point is coming not when we have run all the oil wells dry, but when demand outstrips production. This is when energy prices will skyrocket. Moreover, there is a growing consensus that we are heading for an imminent peak in oil production, if not already past it. Even after massive investment by the oil companies in non-OPEC, the areas in Alaska and the North Sea are about to enter a period of irreversible decline. The International Energy Agency (IEA) estimates that the oil industry needs to invest several trillion dollars over the next 30 years in exploration and production.

The search for new sources of energy is now one of the most important challenges for the new century. Fully 25% of the world's proven oil reserves sits under Saudi Arabia. Add its four neighboring kingdoms and that number soars to 66%.

The absolute cost of carbon-based fuels, particularly petroleum, has increased dramatically over the last decade along with the political and military consequences caused by the world's increasing reliance on it. And now there is a direct connection between petroleum emissions and the increasing problems of global warming, urban pollution and serious health issues for children as well as the elderly.

Energy production has now been conclusively linked to global warming. Its emissions emit $CO_2$ and particulate that reduce the ozone layer and add micro-particles to the atmosphere. The only solution is to develop an energy that does not produce heat, carbon dioxide, carbon participate, $SO_2$, and waste products or need an extensive global supply and refining system. Also we do not want an energy producing technology that fills up the countryside with machinery eyesores and noise. Oil certainly does not meet these new requirements, nor does ethanol, biomass or even wind or conventional hydropower. Only solar and ocean power meet these high energy standards.

Such a transition of substance will have profound implications for the economy, the environment, and U.S. foreign policy. Thomas Friedman, New York Times columnist and author of "The World is Flat, A Brief History of the Twenty-First Century" has published an article in Foreign Policy magazine, stating that the price of oil and the pace of freedom always move in opposite directions. Many of the Third World countries suffer from polluted cities affecting their tourism, high petroleum import costs and growing power grid failures weakening their economies and their fragile currencies. These countries can now produce their own renewable energy producing infrastructure utilizing an advanced materials, design and production system developed in America.

There are approximately twelve generic types of wave energy conversion systems. A wave energy converter may be placed in the ocean in various possible situations and locations. It may be floating or submerged completely in the sea offshore or it may be located on the shore or on the sea bed in relatively shallow water. An energy converter on the sea bed may be completely submerged, it may extend above the sea surface, or it may be an energy converter system placed on an offshore platform. Apart from wave-powered navigation buoys, however, most of the prototypes have been placed at or near the shore. Some systems extract energy from surface waves. Others extract energy from pressure fluctuations below the water surface or from the full wave. Some systems are fixed in position and let waves pass by them, while others follow the waves and move with them. Some systems concentrate and focus waves, which increases their height and their potential for conversion to electrical energy. All the current competing technologies convert wave action into energy by providing some way for the wave to transfer its kinetic energy to a piston or turbine, either storing this energy briefly or passing it immediately into a generation device.

Many such devices rely upon a single float for absorbing a wave's energy. The vast majority of prior art for converting wave energy into useful energy rely upon the potential energy of a wave, i.e., the lifting power of the wave. They are based on surface area or displacement as the key factor in energy absorption. Surface operating wave energy converters use the surface area to capture the smaller less powerful surface waves to power them while submerged wave energy converters use displacement to capture a much larger percentage of the total wave energy spectrum in the form of the gravity wave. In general, only a fraction of the incident energy can be absorbed by a floating body. The amount of absorption depends upon the number of degrees of freedom that are excited in the floating body. There are six degrees of freedom namely, heave, yaw, roll, surge, pitch, and sway. A certain amount of energy absorbed will be dissipated as waves radiate outward from the body. The energy in the incident wave is either absorbed, reflected, or transmitted by the body. But displacement type wave energy converters are much more expensive and can only pull energy out a small surface area.

There are only a very few wave generator systems operating today and all but one are still in the design, testing or prototype stage. Wave power development has been dominated by large scale constructions developed by engineers with hydropower and offshore oil derrick backgrounds. The reasons for limited growth of wave generation are primarily due to the unusual characteristics of the source of the energy—ocean waves. Waves are almost entirely composed of wind and gravity driven pressure waves which carry potential energy. Inefficient multiple energy conversion systems are currently used to convert potential energy to usable kinetic energy. Another major problem is location. The ocean environment is the most lethal environment to man and machine. It places machinery under constant attack from shock, moisture, salt, debris, biological forms and cold temperatures. The second part of this problem is the need to place wave power generation systems in high wave power areas which are out at sea. Ocean waves are greatly diminished in strength by shallow depths. This requires long power transmission infrastructure which is costly and suffer from considerable power loss in the lines. Current on shore based coastal wave energy device systems are costly and eye sores. The ocean based systems are also dangerous to navigation. The offshore type sited in the most powerful wave areas need expensive deep ocean anchoring systems and are exposed to the worst storm conditions.

(a) Current ocean energy systems absorb a limited spectrum of the ocean's energy. This is specially important in low density energy where energy cannot afford to be lost;

(b) Many of these devices are large scale in an attempt to maxniize overall energy conversion efficiency, where due to the issue of low density energy, total surface area is even more important than energy conversion efficiency;

(c) Many of the devices use complicated multi-stage energy conversion system to convert ocean's potential energy to kinetic energy;

(d) Due to the complexity and size of many of the devices their surfaces and working parts are vulnerable to fouling from floating debris and marine growth;

(e) Many devices require complex mooring systems which are costly to install and may ensnare ocean wildlife;

(f) Some devices are not self-righting;

(g) Some devices remain on the surface in storm conditions making them vulnerable;

(h) Many devices have a large number of parts which increase the chances of breakdowns and increase build costs;

(i) Many devices are composed almost entirely of custom manufactured parts which increases overall costs and makes scalability harder to achieve;

(j) Most devices are designed to operate individually off their own dedicated mooring system which, reduces their overall surface area and increases build costs;

(k) Due to their complexity many devices have internal, inertial/mass and surface frictions;

(l) Many devices have complicated electrical systems requiring expensive and vulnerable seals;

(m) Many devices are designed to be situated near shore where the highest energy areas are further offshore and in the open ocean;

(n) Most devices cannot be fabricated of recycled materials which decreases their total lifecycle energy costs;

(o) Most devices are stand alone devices which do not offer reduced wave areas for fish trawlers and private ships;

(p) Most devices are not designed for mass production to reduce costs;

(q) Some devices have an observable outline on the surface of the ocean making them eyesores;

(r) Many devices cannot function as a storm surge barriers but cannot because the moored devices have gaps between them;

(s) Many devices do not adapt well to fresh water production;

(t) The natural cycling of wave's energy pulses require the use of higher capacity electrical equipment reducing overall system economics;

(u) Most devices need more hydrodynamic damping to reduce rolling and pitching ensuring an economic production of electricity;

(v) Many devices don't float as low in the water as possible.

(w) Some devices do not have a significant amount of added damping in relation to their total displacement;

(x) Many devices do not have inherent load shedding incorporating features that inherently limit loads and motions once the rated-power wave amplitude has been reached, de-tuning in large waves to prevent excessive loads and motions;

(y) Most devices do not have a degree of resonant response introduced to improve power capture in small waves;

(z) Most devices require closely machined high tensile parts which are expensive and difficult to mass produce;

(aa) Most devices use complicated electrical systems or water reservoirs to eliminate the pulse characteristics of wave energy;

(bb) Most devices cannot meet the global strategy to deal with the successful commercialization of a low density global energy source. This requires large numbers of devices operating all over the world and includes an ease of transportability across national border;

(cc) Most wave energy converters are not smart enough to adapt instantly to the changing ocean conditions so that they can absorb the maximum amount of energy while at the same time able to reduce their energy profile to be able to survive massive storm conditions.

OBJECTS AND ADVANTAGES

Accordingly, several objects and advantages of my invention are:

(a) the device absorbs a large spectrum of wave energy:

(b) the device is a relatively small modular energy device forming an array of devices that are better then a few large scale, complicated energy devices because overall surface area is more important than overall efficiency;

(c) the device is designed for both offshore and ocean siting;

(d) the device uses a low speed, high torque propeller turbine to extract energy from 10-20 mph breaking waves weighing many tons;

(e) the device utilizes rounded, non-fouling, self-cleaning surface and flow-thru design to repel debris and marine growth;

(f) the device's low speed operation, rounded surfaces and minimal anchor cables provides safety for wildlife;

(g) the device is self righting;

(h) the device submerges below storm conditions;

(i) the device has minimum parts count thus reducing costs and the potential for breakdowns;

(j) the device maximizes the use of available parts;

(k) the device minimizes internal, inertial/mass and surface frictions;

(l) the device is easy to install and to remove and annual service;

(m) the device does not have a complicated electrical systems;

(n) the device can be situated either offshore in 200+ feet depth or in highest energy areas of the open ocean;

(o) the device is composed of recycled materials;

(p) the device creates reduced wave areas for fish trawlers and private ships;

(q) the device is mass producible at low cost;

the device has a low observable outline and only within a mile;

(r) the device also functions as a superior storm wave and surge barrier because there are no gaps between each unit;

(s) the device integrates better into water production;

(t) The natural cycling of the wave's energy pulses is smoothed out by the air compression system enabling the use of lower capacity electrical equipment. This saving can more than offset the cost of such storage components, thereby improving overall system economics. It also solves the cyclical power of waves by pumping into a compressed air system leading to a shore based generator;

(u) Ocean waves vary in many ways needing a smart device to continuously change itself to convert the most energy and survive the challenging elements;

(v) the device reduces rolling and pitching to ensure an economic production of electricity; the main body is designed to float as low in the water as possible;

(w) the device has a significant amount of hydrodynamic dampening in relation to its displacement;

(x) the device inherently limits and sheds loads and motions once the rated-power wave amplitude has been reached;

(y) a degree of resonant response is introduced to improve power capture in small waves;

(z) most of the parts can be mass produced of standard steel and some can be all plastic parts;

(aa) the device is designed around the need for a global strategy to deal with the successful commercialization of a low density global energy source requiring large numbers of devices operating all over the world;

(bb) the device's business model's ease of transportability across national borders makes it well suited for globalization. The invention's business model strikes a balance between locating expertise close to markets and centralizing other aspects of the business in one global organization. Centralization includes technology, product development, marketing, and IT infrastructure. Other divisions like sales, business development, and supply chain management are local to be closest to markets requiring local expertise and subject to regional variations.

SUMMARY

The present invention relates to an ocean wave energy generation system. The invention is of an inexpensive, rugged and mobile design that is low cost and energy efficient. An array of interconnected ocean energy devices designed for both offshore and ocean siting are arrayed across the path of the direction of the primary wave so as to absorb the largest spectrum of wave energy. The invention has a non-fouling, self cleaning surface that repels both debris and marine growth. Its low operational speed rounded surfaces and minimal anchor cables provides the ultimate safety for wildlife. It submerges below storm conditions to survive. It has a minimum number of parts to reduce costs and breakdowns as well as maximizing the use of available parts. It minimizes internal, inertial/mass, the number of energy conversion stages and surface friction to offer high overall energy conversion efficiency. It is easy to install and to remove and from its operational site and service by automated means. It is primarily made of recycled materials. It is mass producible at low cost. No energy costs, fees, royalties, real estate tax are needed to be paid—wave energy is both free and abundant. It produces no greenhouse gas (GHG) emissions, directly or indirectly.

DRAWINGS

Figures

The present invention may be better understood, and its numerous features and advantages made apparent to those skilled in the art by referencing the accompanying drawings. For ease of understanding and simplicity, common numbering of elements within the illustrations is employed where an element is the same in different drawings.

FIG. 5 is the side view of the energy absorption element of the unit of the array of devices.

FIG. 6 is the front view of the energy absorption element of the unit of the array of devices.

DRAWINGS

Reference Numerals

100 Array of Devices
102 Ocean Energy Module
104 Support Vessel
106 Energy Absorber
112 Electric Generator Plant
114 Underwater Pressure Lines
116 Compressed Air Pipes
118 Slack Moored System
119 Onshore Storage Reservoir
120 Air Turbine Electric Generator
123 Wiring Harness
125 Network of Sensors
200 Focuser
201 High Pressure Hose
202 Leading Edge
203 Telecommunications system
204 Trailing Edge
205 Electro-pneumatic controller
206 Steel Panels
208 Rear Buoyancy Tube
209 Rear Buoyancy Hinge
210 Wave Diverter
211 Stabilizer Tube
213 Crash Bulkhead
214 Barge Board
215 Nose Section 216 Adjustable Flap
217 Flexible Coupling
219 Onboard Computer
221 Front Buoyancy Tube
400 Tower/Strut
402 Propeller
403 Drive Shaft
404 Gearbox
405 One Way Valve
408 Air Compressor
409 Waterproof Housing
412 Controlled Actuator

DETAILED DESCRIPTION OF THE INVENTION

FIGS. 1A and 1B—Preferred Embodiment

The following is a detailed description of illustrative embodiments of the present invention. As these embodiments of the present invention are described with reference to the aforementioned drawings, various modifications or adaptations of the methods or specific structures described may become apparent to those skilled in the art. All such modifications, adaptations, or variations that rely upon the teachings of the present invention and through these teachings have advanced the art, are considered to be within the spirit and scope of the present invention.

Figure 1:
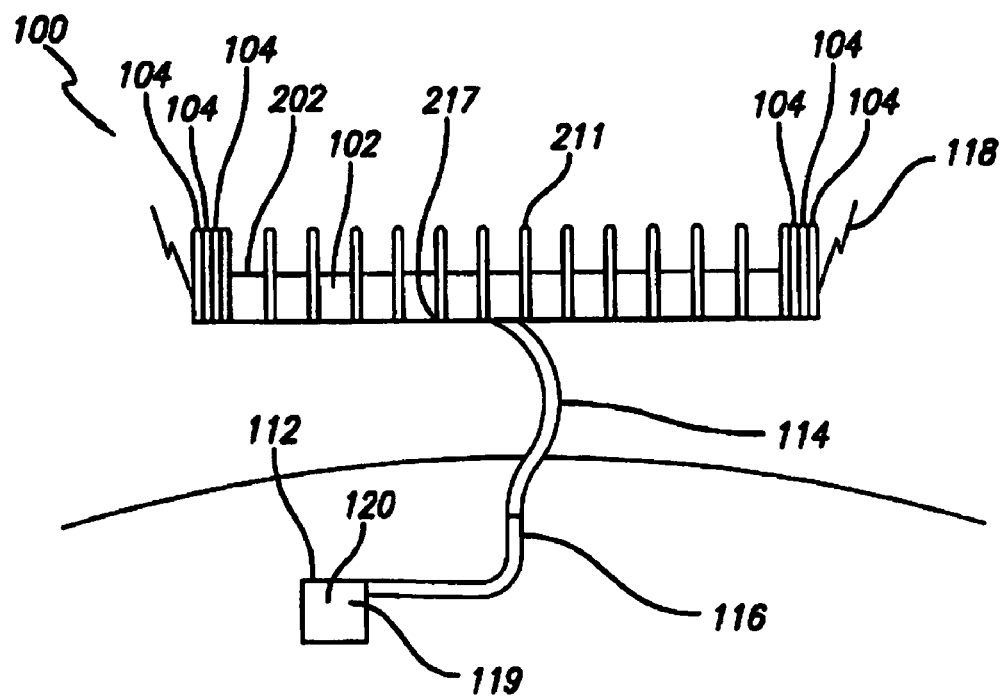
FIG. 1 is the top plan view of the long, semi-submerged floating array of devices incorporating the principles of the invention.

FIG. 1 is a top view of a long, semi-submerged floating Array of Devices 100 composed of a plurality of individual and identical Ocean Energy Modules (the invention) 102 deployed and connected beam to beam. Each end of the Array of Devices 100, composed of several Ocean Energy Modules 102, is moored to the ocean bottom through high buoyancy Support Vessels 104. The individual Ocean Energy Modules 102 measuring approximately 100 feet wide by 100 feet long by 30 feet deep are connected together to form approximately one mile long Array of Devices 100 composed of fifty Ocean Energy Modules 102 each. The approximately 800 Energy Absorbers or Converter Units 106 per mile long Array of Devices 100 are connected via High Pressure Hose 201, Underwater Pressure Lines 114 and Compressed Air Pipes 116 to an on-shore Electrical Generating Plant 112.

Figure 2:
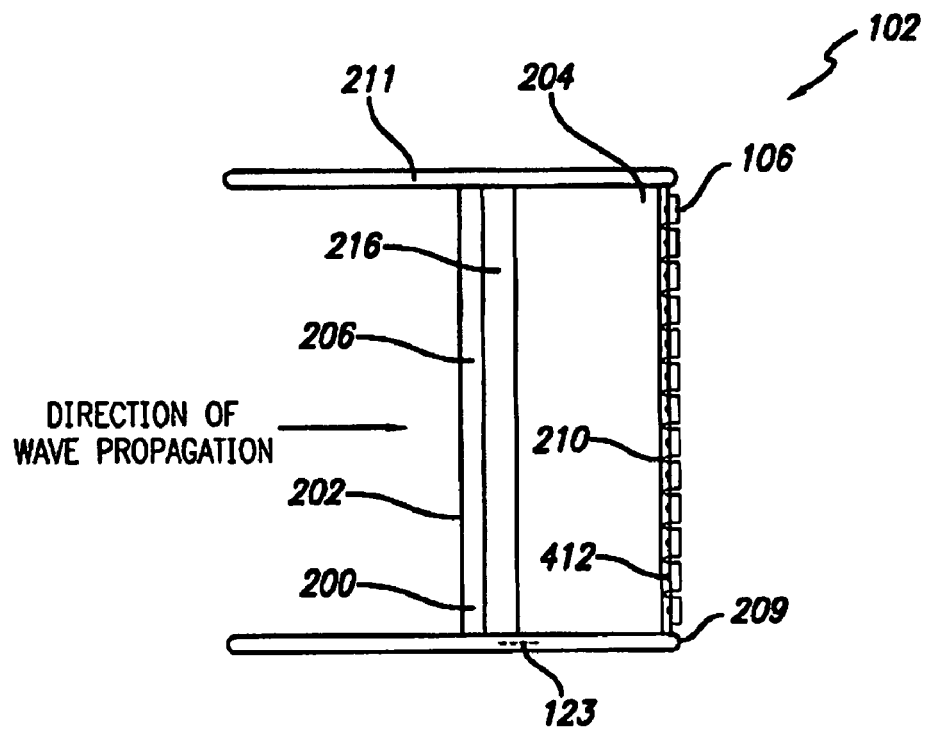
FIG. 2 is the top plan view of one unit of the array of devices.
Figure 3:
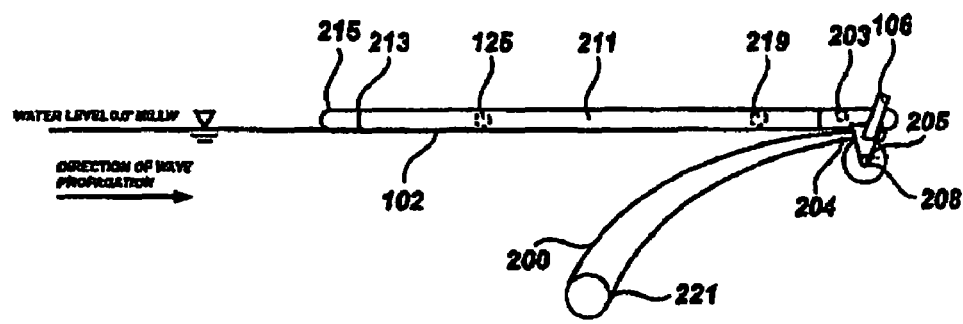
FIG. 3 is the side plan view of one unit of the array of devices.

FIG. 2 is the top plan view of the Ocean Energy Module 102. Each Ocean Energy Module 102 is composed of a Energy Absorber or Converter Unit 106 comprising 16 six foot diameter four bladed Propellers 402 with attached outer cowlings each driving an Air Compressor 408. FIG. 3 is the side plan view of the Ocean Energy Module 102. The Focuser 200 is a wing shaped structure approximately 50 feet long by 100 feet wide with its Leading Edge 202 approximately 30 feet under the surface of the water and its Trailing Edge 204 zero to approximately two feet below the surface of the water. The Focuser 200 is composed of approximately 50 feet by 10 feet thin wall steel panels 206 supported by an approximately 6 foot diameter thin wall steel Rear Buoyancy Tube 208 which runs beam to beam across the rear in the configuration of the Focuser 200 and Front Buoyancy Tube 221 running beam to beam across the full frontal width of the Ocean Energy Module 102. The Steel Plates 206 are hydro formed to interlock and glue with an interlocking joint between each panel. The first half of the Focuser 200 is curved at approximately 45 degrees leading to a flat horizontal section. The angle of the Focuser 200 can be altered using a Hinge Mechanism 209 at the connection between the supporting Rear Buoyancy Tube 208 of the Focuser 200 and the Stabilizer Tubes 211 and powered by a Onboard Computer 219 controlled Electro-pneumatic Controller 205 controlling the height of the Leading Edge 202 of the Focuser 200. A change in the buoyancy in the Front Buoyancy Tube 221 and the Rear Buoyancy Tube 208 can be used to change the angle of the Focuser 200. The surface of the Focuser 200 is enhanced to induce drag with the use of an Adjustable Flap 216.

Figure 4:
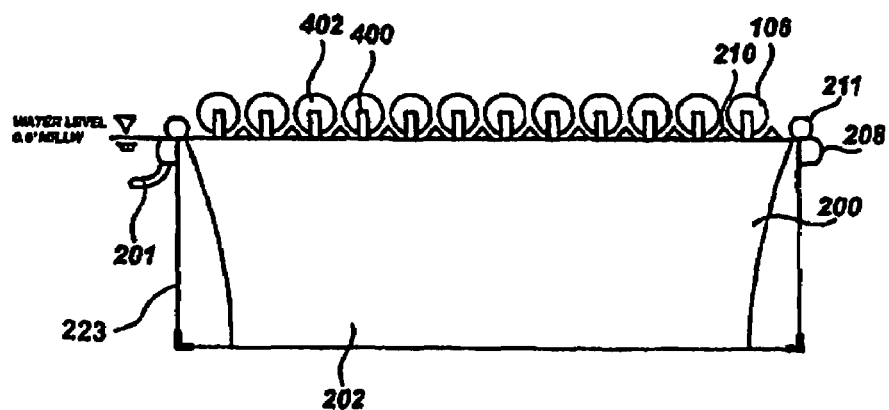
FIG. 4 is the front view of one unit of the array of devices.
Figure 7:
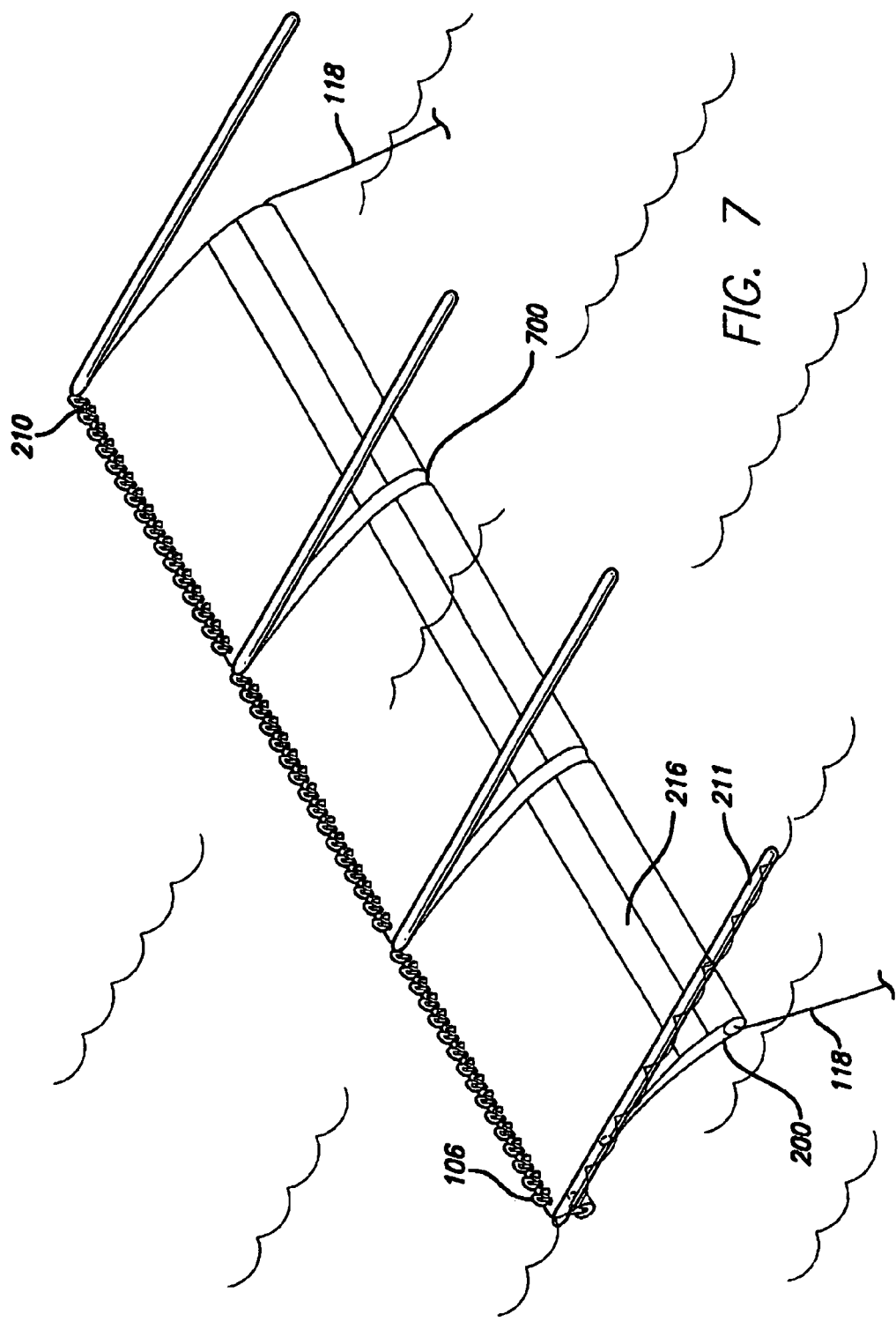
FIG. 7 is a perspective view of the array of devices clarifying the drawings shown in FIGS. 1-6.

FIG. 4 is the front view of the Ocean Energy Module 102. FIG. 5 is the side view of the Energy Absorber or Converter Unit 106 and FIG. 6 is the front view of the Energy Absorber 106. Each Energy Absorber 106 is composed of a Tower/Strut 400, incorporating a Propeller 402, Driveshaft 403, Gearbox 404 and Air Compressor 408. The Energy Absorber 106 resembles an upside down outboard motor configuration where the lightweight composite Propeller 402 is attached to the rear of the upper section of the Tower/Strut 400 so it can rotate freely through approximately an 180 degree arc. A self-lubricating composite Driveshaft 403 carries the rotational power down through the Tower/Strut 400 to a Gearbox 404 and Air Compressor 408 at the bottom encased in a streamlined Waterproof Housing 409, which is finned for cooling of the unit. Each Air Compressor 408 is rated at approximately 77 kW. Each of the 16 Energy Absorbers 106 per Ocean Energy Module 102 is attached through the Trailing Edge 204 of the Focuser 200 via a Hinge 410 on the Rear Buoyancy Tube 208, and held upright by an electro-pneumatically Controlled Actuator 412 which allows the entire Energy Absorber 106 to rotate downward on a horizontal axis.

The Rear Buoyancy Tube 208 is attached through a Hinge 209 at both ends to two Stabilizer Tubes 211 each approximately 3 feet in diameter and approximately 100 feet in length composed of thin wall steel sections fitted and welded together. The bow section has a Crash Bulkhead 213. The bow has a streamlined Nose Section 215. At the rear end of the Stabilizer Tubes 211 is positioned the Focuser 200, each approximately 100 feet wide by 50 feet long leading from either side of the Stabilizer Tubes 211. One end of the Focuser 200 is permanently attached to the right Stabilizer Tube 211 while the other end is attached through a Flexible Coupling 217 composed of a universal joint to the next Ocean Energy Module 102 abeam of it.

In the single unit configuration, a thin wall steel Barge Board 214, is attached to the Buoyancy Tube 208 at its aft end and runs down to the Focuser 200 and forward to its Leading Edge 202.

The Barge Board is cut back just behind the Energy Absorbers 106.

Each Ocean Energy Module 102 is attached to the next through flexible attachments between the Focuser 200 and one Stabilizer Tube 211 and a fixed attachment to the other Stabilizer Tube 211. The outside edges of the Focuser 200 are composed of a flexible material 223 that connects to the next Ocean Energy Module 102. The invention's Wiring Harness 123 is applied to the flat polymer surface coating of the formed and rolled steel panels by a robotic printer.

The air compression system for each Ocean Energy Module 102 is composed of approximately 6 Propellers 402 driven Air Compressors 408 connected via the pressurized Rear Buoyancy Tube 208 at the rear end of the Focuser 200 which also serves as an accumulator. It is connected through Flexible Hose 201 to the next Ocean Energy Module 102 thus connecting all Ocean Energy Modules 102 into the Array of Devices 100. These accumulators include the Stabilizer Tubes 211 of each Ocean Energy Module 102, the Support Vessel 104, the entire compressed air tubing and the on-shore Storage Reservoirs 119.

Each Ocean Energy Module 102 has 16 approximately 77 kW Air Compressors 408 which are connected through One Way Valves 405 to High Pressure Hose 201 that connects through all the Ocean Energy Modules 102 in the Array of Devices 100 and sends the compressed air via Underwater High Pressure Lines 114 to shore side where it is converted by Air Turbine Generators 120 to utility grade electric energy.

The Electric Generator Plant 112 can be sited on the shore or the underground Compressed Air Pipes 116 leading on shore can be laid to a site further inland. The shore side compressed Air Turbine Generator 120 system will be of much smaller scale than standard fossil fuel power plants without the need for the coal, oil or nuclear energy producing side of the plant. It can be of standardized modular construction to minimize site specific design, site work and in-situ construction. The Air Turbine Generator 120 will be of modular design, preferably with counter-rotating planes of blades mounted directly onto their own generator shafts. The Air Turbine Generator 120 used does not need to be marinized. They are small and light enough to be trucked to the site.

The Array of Devices 100 links approximately 50 of the 100 foot wide Ocean Energy Modules 102 together which in turn connect to Support Vessels 104 on each end. These Support Vessels 104 are rounded steel units of approximately 100 feet long by 3 feet in diameter and of similar construction to the Stabilizer Tubes 211.

The mooring system uses a slack Moored System 118 with submerged floats to support the majority of the weight of most of the mooring cable and uses anchoring line "diffuser" plates.

A Telecommunications Module 203 is placed under an inspection hatch in the rear collision bulkhead of the Stabilizer Tube 211. The Telecommunications Module 203 includes a flat panel satellite receiver.

Operation—FIG. 1, . . .

In the open ocean, waves have a natural balance where swells range from 200 to 1400 feet in length, most often in the 700 feet range. As waves grow taller they look less and less like a sine wave and develop a sharp peaked crest. This peak eventually becomes unstable and the wave reaches the upper limit of steepness above which it will fall over under its own weight. The upper limit is a wave with a height/length or steepness ratio of 0.14. Most waves fall in the steepness range of 0.02 to 0.10 with an average of 0.03 or 0.04. As a wave ages, it gradually grows higher, longer and consequently faster (since wave speed is a function of length). The wave will continue to grow in these ways dependent on both duration (length of time the wind has blown on the wave) and fetch (distance over which the wind has blown on the wave); until it reaches it's fully developed state. Meanwhile, because wave speed is increasing, the ratio if wave speed/wind speed is also increasing. The wave builds in height more quickly than it builds in length, until it reaches its maximum height for a given wind strength. This occurs at a ratio of wave speed/wind speed of 0.5, and because wave height is maximized and wave length is still growing, the wave is at its steepest point in its development. At this point the wave height averages about 10 percent of the wave length. Still more duration and fetch are required before the wave is fully developed in length. As the wave continues to lengthen and consequently increase in speed, the steepness decreases gradually until the wave speed/wind speed is about 1.3 and steepness averages about 0.025. As a general rule of thumb, average wave heights is 0.6 times wind speeds minus 5 feet.

A prime target of this invention is the high wave energy (65 kW/meter) areas off the coasts of many countries including Japan, China, Australia, New Zealand, South Africa, Scotland, Ireland, Netherlands, Germany, Norway, Iceland, Russia, Canada, US East and West coasts, Chile, Argentina and Hawaii which all have waves of approximately 6 feet in height, approximately 455 feet in length, an approximate wave speed of 30.5 knots (51.5 ft/sec) and an approximate period of 10 seconds with a pressure wave reaching down as far as approximately 225 feet. The invention can be scaled down to operate at lower power output specifically in the form of 500 kW and 250 kW units which are designed for 31 kW/m2 and 17 kW/m2 ocean energy density sites making the invention able to operate successfully in many parts of the world.

The present invention operates as follows. Ocean waves are sequences of high and low pressure areas that move along a foundation of basically still water about half the depth of the overall length of the wave's swell. The majority of the pressure wave's energy is near the surface. The basic concept of the inventor's device is to replace the upper portion of the still water with a high friction curved floor which simulates a lee shore beach. Overall, the operation of the invention begins with wave energy first entering the energy capture Array of Devices 100 composed of hundreds of Ocean Energy Module 102 devices linked together creating a Array of Devices 100.

The invention, the Ocean Energy Module 102, deployed in large numbers, is connected beam to beam to form a long, semi-submerged Array of Devices 100 deployed so as to intercept wave energy from a line parallel to the incident wave crests. As the swell propagates towards the device, the individual wave's rotational energy meets the sloping floor of the Focuser 200. The rotational energy begins to drag along the sloping floor, tilting the rotational axis of the wave past its original vertical symmetry. The momentum of the wave at the floor becomes less than that at the crest. Hence, speed at the top of the wave is greater than its speed at the bottom. When the speed and momentum of the crest moves far enough past the rotational energy dragging across the floor, the crest falls toward the trough resulting in a folding over of the wave and in a loss of its energy. The rate of energy loss is dependent upon the slope of the seafloor.

The Focuser 200 is designed to create a surging breaker, the most energy rich and least aerated of the three generalized types of breaking waves. A spilling breaker loses its energy over a seafloor that has little slope. The crest slides down the wave face, slowly dissipating its energy toward shore. A steeper sloping seafloor produces a plunging breaker. This type of breaking wave loses much of its energy instantaneously. The plunging breaker is characterized by its steeper face with a crest that curls or "tubes" towards the trough. A surging breaker is produced where the slope of the seafloor is at its steepest. These waves never classically break; instead, they slide smoothly up the Focuser 200 ramp creating maximum power with minimum aeration of the water. This creates the least aerated, thus densest wave with the longest power cycle. Thus, each Ocean Energy Module 102 breaks the wave into kinetic energy. This slows the forward movement of the waves at the front of the swell, bunching the waves as they move toward the device. As the wave enters the Focuser 200 its induced drag trips the upper section into falling forward creating a burst of kinetic energy. This slow down also backs up and heightens the waves behind it thus speeding up and increasing the energy density of the wave's overall power pulse and reducing overall wave period. The Front Buoyancy Tube 221, Rear Buoyancy Tube 208 and Focuser 200 are heavily ballasted with water which is pumped in and out to improve its efficiency.

Each Ocean Energy Module 102 captures the energy and converts it into compressed air using Propellers 402 each driving an Air Compressor 408. This is further enhanced by the use of Wave Diverters 210 which also serves as a strengthening rib for the Focuser 200 and a wave diverter. The air compression system uses the entire compressed air system as accumulators to store energy thus smoothing out the cycling wave's energy pulses. This enables the use of lower capacity electrical equipment. This saving can more than offset the cost of such storage components, thereby improving overall system economics. It also solves the cyclical power of waves by pumping into a compressed air system that acts as a accumulator for a shore based Electric Generator Plant 112.

During every second of operation approximately 200 of the approximately 800 Energy Absorbers 106 per mile long Array of Devices 100 are pumping air pressure to an on-shore Electrical Generating Plant 112 via an underwater High Pressure Line 114. This configuration, using a large array of small devices to capture the wave energy maximizes the frontal surface area of each wave thus fully utilizing one of the primary advantages of wave power, namely that is each wave is a condensed form of wind, and therefore, solar energy.

The Focuser 200 acts as a pressure wave focusing mechanism to lift and drive as much water mass forward causing the oncoming ocean waves to collapse over the Ocean Energy Module 101 within the shortest distance, with the most concentrated force and without creating any counter waves. The angle and depth of the Leading Edge 202 can be tuned to the prevailing wave by using a Hinge Mechanism 209 at the connection between Rear Buoyancy Tube 208 and Focuser 200 and the Stabilizer Tube 211 which is powered by a computer controlled Electro-pneumatic Controller 205.

The Focuser 200 causes the wave to collapse forward directing its power into approximately 16 Energy Absorbers 106. The Propeller 402 is optimized for the 10-20 mph velocity of the average breaking wave. Though the blades turn relatively slowly the rotation generates a great deal of torque. The Propeller 402 freely rotate through a 180 degree arc so as to pick up various off-center wave angles of attack. The Propellers 402 are made of high strength composite to reduce inertial loses so they can accelerate quickly and rotate efficiently at low variable speeds. Each Energy Absorber 106 automatically reshapes and retunes itself for changing wave size and duration via the flexible characteristics molded into the composite material. The shape of the Propellers 402 are designed to eliminate fouling, reduce marine growth and deal with ocean borne debris. The Energy Absorbers 106 offers superior efficiency due to the high torque characteristics through the constantly changing programmable solid state suspension. Its adjustable Propellers 402 are smart, updating the Onboard Computer 219 on their deflection profile which is also altered automatically using a Electro-pneumatic Actuator 412 from low angled, high torque startup at the beginning of the wave surge through to a high angle high speed profile. The Focuser 200 has computer controlled active hydrodynamic surfaces on both its Leading Edge 202 and Trailing Edge 204.

Attached to and below the Trailing Edge 204 of the Focuser 200 is the Rear Buoyancy Tube 208 that supports the Energy Absorbers 106. The Propeller 402 rotation is then turned into energy via a Driveshaft 403 through the Tower/Strut 400 to a Gearbox 404 and Air Compressor 408 at its base through a One-Way Valve 405 and on through a High Pressure Hose 201 to an on-shore Storage Reservoir 119, which stores the compressed air power to drive an air turbine based Electric Generator 120.

The Ocean Energy Module 102 is composed of a Stabilizer Tube 211 approximately 3 feet in diameter and approximately 100 feet in length composed of thin wall steel. The Stabilizer Tube 211 is on either side of the Focuser 200 which acts as a very large submerged dampener. The device reacts against itself, rather than against a fixed reference frame such as the sea bed. The source of reaction is 'length-down-wave' as this allows significant de-referencing in the long wavelengths associated with storm waves and presents the minimal cross-sectional area to the passage of extreme waves in which drag loads become significant. The bow section of each Stabilizer Tube 211 is streamlined to be as buoyancy neutral as possible and to penetrate the oncoming waves efficiently. The Stabilizer Tube 211 can be easily and inexpensively tuned to each site's average prevailing ocean wave by lengthening or shortening its overall length. The Rear Buoyancy Tube 221 further help stabilize the Ocean Energy Module 102. The Stabilizer Tube 211 is designed to penetrate the oncoming wave with minimum shock and lift. The Stabilizer Tube's 211 primary function is to provide a stable platform in order to maintain the Ocean Energy Module's 102 position relative to the surface, and to support the Focuser 200 and Energy Absorber 106 with a stable platform. It also serves as a strong link in the Array of Devices 100. To reduce rolling and pitching and to ensure an economic production of electricity the Ocean Energy Module 102 is designed to float as low in the water as possible. In the back half of the Ocean Energy Module 102 is positioned the Focuser 200, approximately 50 feet long by 100 feet wide leading from either side of right and left Stabilizer Tube 211. The rear of the Energy Absorber 102 is designed to exhaust the spent wave as quickly and with the least drag as possible and causing the least distortion of the passing pressure wave which allows the pressure wave to reform quickly with minimum energy loss. This creates the opportunity to moor other Arrays of Devices 100 in parallel formation behind the first unit. It is also designed to allow each Energy Absorber 106 to flip down flat to reduce stress on the Ocean Energy Module 102 during maximum sea conditions. The Ocean Energy Module 102 is designed to sink in an emergency situation such as breaking free after being hit be a large ship and be recovered later from the sea floor.

Each Ocean Energy Module 102 is attached to the next Ocean Energy Module 102 through rigid attachments to the Focuser 200 and the flexible coupling High Pressure Hose 201 of the Focuser 200. The connections use a universal joint with shock absorbing material to reduce stress. The compressed air connection High Pressure Hose 201 leads from the Rear Buoyancy Tube 208 of one Ocean Energy Module 102 to the Rear Buoyancy Tube 208 of the next Ocean Energy Module 102.

An air compression system plays an essential role in the operation of the device. The losses associated with piping gases over long distances are considerably less than those associated with transmitting electricity. For instance, with respect to oxygen and hydrogen transmission, very little pumping power is required to move the gases through a pipeline. By way of analogy, in the transportation of natural gas, pressures of 700 psi are sufficient to move the gas over several hundreds of miles without the necessity of providing auxiliary pumping stations. Thus, it is more efficient to provide pipelines for the gaseous products of offshore energy capture rather than suffering the losses in transmitting electricity over several miles to a shore-based electric generating facility. The output of a wave energy device will tend to follow the envelope profile of various wave groups causing uneven power output. The air compression system uses accumulators to store energy to smooth out these pulses. These accumulators include the Stabilizer Tube 211 of each Ocean Energy Module 102, the Support Vessels 104, the entire compressed air tubing system and shore based compressed air storage. This enables the use of lower capacity electrical equipment. This saving can more than offset the cost of such storage components, thereby improving overall system economics. It also solves the cyclical power of waves. Electro-pneumatic Controllers 205 use the energy of the compressed air system to control the angle of the Focuser 200 as well as its depth and the depth of the Energy Absorbers 106.

The Propeller 402, is basically a lightweight version of the traditional propeller optimized for the 10-20 mph velocity of the average breaking wave. The Propeller 402 is modified using a streamlined cowling which the outer ends of each Propeller 402 blade is attached to. This focuses the passing water into the Propeller 402. Though the blades turn relatively slowly the rotation generates a great deal of torque. The Propellers 402 are made of high strength composite to reduce inertial loses so they can accelerate quickly and rotate efficiently at low variable speeds. The Energy Absorbers 106 offer superior efficiency due to these high torque characteristics. Each blade of the Propeller 402 is spring loaded to increase the angle of the blade as it speeds up. Each blade has a series of molded in ribs approximately 1 inch high. These ribs are designed to grip the water, reducing the possibility of aeration and obtain more power from it while strengthening propeller structure and protecting it from damage from debris. The blade is naturally unbalanced on its rotational center and spring loaded. Normally it is in an almost open position and as the density of wave increases it flattens utilizing an air pressure controllable spring back system controlled by Onboard Computer 219 thus increasing torque loading to the Driveshaft 408. It is also pneumatically adjustable Propeller 402 blades electronically update the Onboard Computer 219 on their deflection profile which can be altered automatically from low angled, high torque low speed startup at the beginning of the wave surge through to a high angle high speed profile.

In a single unit configuration, a thin wall steel Barge Board, is attached to the Buoyancy Tube 208 at its aft end and runs down to the Focuser 200 and forward to its Leading Edge 202 to contain the underwater pressure wave. The Barge Board compresses the oncoming waves approximately 24 inches in toward the Energy Absorbers 106 thereby increasing the power of the oncoming wave. The water is thereby squeezed and as a result the speed goes up (principle of Bernoulli). As the kinetic part of the energy goes up with the square of the speed of the water, a small increase of speed gives a relatively large increase of kinetic energy. It also creates a vertical side wall surface to efficiently direct the waves into the Energy Absorbers 106. The Barge Board is cut back just behind the Energy Absorbers 106 to maximize the outflow of exhaust water. The Barge Board offers no added buoyancy to the Ocean Energy Module 102.

A system using electric generators is complex, heavy, and vulnerable to moisture. It usually needs an input field current, so it will always be consuming electricity and it will also need a control circuit, a switch, or a memory system all of which have to be placed in the corrosive ocean environment. Instead the compressed air system has minimum working parts, is lightweight, cheap and non-corrosive. The Electric Generator Plant 112 can be sited on the shore or utilizing Compressed Air Pipes 116, can be laid to a site further inland. The shore side compressed air powered Electric Generator Plant 112 will be silent, non polluting and much smaller in scale without the need for the coal, oil or nuclear energy producing side of the plant. It can be of standardized modular construction to minimize site specific design, site work and in-situ construction. The air turbine generators are of modular design, preferably with counter-rotating blades mounted directly onto their own generator shafts. The air turbine generators used do not need to be marinized, lightweight and of smaller size and therefore of significantly lower cost than those required if they were placed on each energy module.

The Array of Devices 100 links approximately 50 of the 100 foot wide Ocean Energy Modules 102 together which in turn connects to Support Vessels 104 at each end. These vessels are similar in design to the main body of each Ocean Energy Module 102 but on a larger scale of approximately 100 feet long by 3 feet in diameter and of similar construction. Their function is to carry the stress placed on the Array of Devices 100. The Support Vessels 104 retains the extra buoyancy needed to keep the Ocean Energy Modules 102 at the ends of the Array of Devices 100 from submerging due to the overall wave induced drag on the Array of Devices 100. The Support Vessels 104 are also used as air compression reservoirs. They can also be self-powered and remotely controlled to provide towage for the Array of Devices 100 to and from shore side facilities.

The Slack Mooring System 118 is a vital part of the invention. It does not just connect the Array of Devices 100 to the sea bed but is designed to interact and indeed counteract with each Ocean Energy Module 102 in order to reduce the forces in the mooring system and to maximize performance. It uses a slack moored system with submerged floats to support the weight of most of the mooring cable. It also uses anchoring line "diffuser plates. Certain system parameters, such as minimum allowable yoke length and anchor requirements, are dictated by the highest wave expected during the life of the system; usually an estimate of the 100 year wave is used for this purpose. The fossil-fuel industry has developed better ways to anchor equipment including drill in anchors, more durable and corrosion-resistant materials, and power grid on bottom utilizing connectors and improved cables for carrying electric current underwater.

Because the Ocean Energy Module 102 in the form of Arrays of Devices 100 is such an efficient energy absorber of wave energy, and allows the efficient flow of the underwater pressure wave energy to pass through it and recombine, several Arrays of Devices 100 can be stacked in a parallel formation behind the lead Array of Devices 100. This configuration can also be used in certain cases to serve the purpose of a protective barrier or breakwater to reduces damages caused by storm waves and storm surges.

An intelligent device is needed to continuously change itself to convert the most energy as well as survive the challenging elements. The response function of the Energy Absorber 106 is a function that describes the power absorbed as a function of frequency. The power extracted from the waves by an Ocean Energy Module 102 is determined by mathematically integrating the product of the spectral density function and the response function over all frequencies. The invention is smart where intelligence is needed. It maximizes interactivity with the environment. An intelligent device is needed to continuously change itself to convert the most energy while at the same time surviving the challenging elements. Wave energy varies even in the highest power concentration locations so the device is able to constantly tune itself for those changes as well as collapse and dive under the waves for protection. It includes: object detection, collision warning, stability controls, operational efficiencies and actuators controls. The Onboard Computers 219 on each Ocean Energy Module 102 converses with the Onboard Computers 219 of other Ocean Energy Modules 102 connected in the Array of Devices 100 with millisecond bursts of information to warn of impeding changes in wave characteristics or oncoming debris thus creating an intelligent grid of devices. The Network of Sensors 125 using self-learning neural networks are employed to monitor all drive systems, hydrodynamic efficiencies, and linking the Navigation Lights and short range radar to trigger the entire Array of Devices 100 to light up if approached while emitting a warning beacon, horn blast and radio message.

A Network of Sensors 125 molded into the Ocean Energy Module 102 continuously monitors the performance of the various subsystems, ocean environment and security, feeding an Onboard Computer 219. The biologically inspired central control system works like the synapses of the brain with each sensor responding to different inputs thus integrating huge amounts of information. This controls in real time the performance of the "smart" Ocean Energy Module 102 and ensures the constant and efficient conversion of the widest spectrun of wave energy. System management includes sophisticated techniques for automatically disconnecting the system in very large waves, and automatically reconnecting when the waves return to normal profiles. It creates pervasive computing, where everything that has electricity will have software in it, and pervasive networking, everything will be hooked together. The Focuser 200, Stabilizer Tube 211, Energy Absorber 106, Network of Sensors 125 and the Communication System 203 form a "network on the ocean" to increase the intelligence of the device and connect it to the outside world. This Ocean Energy Module 102 will prove less expensive to own and maintain. Software monitors 100% of all systems and automatically report any anomalies to global and regional franchise computers notifying them of a needed service appointment. This allows it to use a remote automatic control of its systems using a shore side remote control unit composed of a large multipurpose screen looking much like a dashboard having touch sensitive controls. This is supported by a head-up display. This reduces the space and time constraints to operate, service and repair the Ocean Energy Module 102.

The Array of Devices 100 is designed to be easily and cost effectively transportable between shore based construction and service facilities and the energy producing fields. The Array of Devices 100 collapses into a stabile, low drag series of units to hook up and detach from the on-site mooring system. This is done by rotating the entire Focuser 200 and Energy Absorber 106 up out of the water using pneumatically powered Hinge Mechanism 209. A tow vessel or a self-powered remotely controlled vessel is used to move the Array of Devices 100 on and offshore.

Wiring is a notoriously weak link in the marine environment. Not only is it constantly under attack by corrosion caused by the acidic environment, but it is under the constant shock and vibration of the pounding waves. This is doubly so when used aboard the Ocean Energy Module 102 which is at sea 24/7 and is designed to absorb the energy in the ocean waves rather than cut through them like a normal ship. Interconnections within the distribution box and interconnections to the wire harnesses can create an unmanageable bundle of wires. This consumes valuable space and requires costly manual point-to point wiring. Manual wiring not only reduces production efficiency, but also can cause wiring errors. Entangled wire bundles are often a potential for shorts and other types of electrical faults. The invention's wiring is a cost-effective alternative for harness design. The invention's Ocean Energy Module 102, a print on "virtual wiring" system with redundant wiring. An automated design and fabrication of Wiring Harness 123 is utilized. It is printed on plastic backing and glued to the inside walls of the tubing. The invention's Wiring Harness 123 is applied to the flat polymer surface coating of the formed and rolled steel by a robotic printer. The robot prints the electrical Wiring Harness 123 using electrically conductive polymer as it moves along the surface of the panel or tube. Because hard wiring is not required, harness designs can be simplified and costs reduced. Connections within the module's wiring are made through the currently available electrical connector systems. This seals it from corrosion and supports it from the constant shock of the pounding waves. And it eliminates the valuable space and requires costly manual point-to point wiring not only improves production efficiency, but also reduces wiring errors. A currently available software package automates the design of wiring systems—it pulls together electrical, mechanical and manufacturing data and displays it in a wiring-centric manner. This uses mechanical and electrical CAD tools complementing their exiting automation capabilities making it easier and cheaper to mass produce the energy modules.

The Electric Generator Plant 112 technology is the same as steam turbo generators and gas turbines which are among the most reliable machines operated by modern society and unscheduled outages are rare. The turbine generators are of modular design, preferably with counter-rotating planes of blades mounted directly onto their own generator shafts. The air turbine generators used do not need to be marinized, lightweight of small size which would be the case if they were placed on each Ocean Energy Module 102. This reduces cost and maintenance considerably. The entire unit can be built of standardized modular construction to minimize site specific design, site work and in-situ construction. The Electric Generator Plant 112 can be sited on the shore or Compressed Air Pipes 116 can be laid to a site further inland. The compressed air turbine driven generator systems operates silently and is non-polluting. The entire Electric Generating Plant 116 is of much smaller scale then an equal size fuel fed plant because there is no need for the coal, oil or nuclear energy fuel side of the plant. The particular type of location would not be limited by current oil/gas electric generation emissions, safety and noise concerns.

An important element of a successful energy conversion system is the need to quickly and cost efficiently produce large numbers of these devices due to the inherent low energy profile of ocean power. Thus the inventor incorporated this requirement into his design. The invention uses mass producible designed for assembly Ocean Energy Modules 102 utilizing a manufacturing system of hydro-formed thin wall steel tube and panel sections glued together and coated with a ballistic plastic.

A Telecommunications System 203 is integrated into each Ocean Energy Module 102 which includes software to communicate with vendors for engineering and technical support, design feedback, and systems upgrades. A Supplier Net Module includes hardware and software to interface suppliers, both local and offshore, with manufacturing. Last but not least, the manufacturing includes a Recycling Module, which strips and separates the steel, polymer and parts from old and aged energy modules so they can be reused for manufacturing.

The manufacturing system is composed of a number of interconnected modules, which plug into each other to monitor and communicate with each module. Once the shipping crates have arrived at the proposed production site, the first module to be opened is the user-friendly manufacturing computer program. This is roughly comparable to the install program used in a home computer. The program automatically instructs the operators how to set up the entire manufacturing in their own language while automatically checking all connections and software interfaces. Next to be implemented is the Power Management Systems Module which automatically upgrades the local electric power grid to the manufacturing system's electrical needs and protects the equipment from brownouts and surges. The Master Management Systems Module includes computer hardware and software that connects and controls all phases of production. Its bundled software utilizes built-in artificial intelligence and fuzzy logic and can be quickly updated. It includes all the necessary production, finance, engineering, maintenance and marketing software to manage the energy module factory.

The use of this advanced manufacturing system allows the production plant to be shipped to almost country in the world and set up quickly to mass produce wave energy modules. Given that these devices are similar to automobiles from a manufacturing perspective, and given that 17 million vehicles are manufactured each year in the U.S. alone, wave generator modules based on the inventor's design will produce approximately 50 MW/mile. Approximately one hundred miles or 10,000 units could be built in one regional manufacturing plant and installed in less than 24 months once the tooling is in place.

For off-shore locations beyond the range of economical connection to shore side power generation facilities, onboard electrolyzers and water distillation systems are placed inside the Supply Vessels 104. The water distillation systems feed the electrolyzers which feed a hydrogen liquidfication module all powered by onboard air turbines driven by the compressed air system. The liquefied hydrogen is then piped aboard modified CNG tanker vessels or specially designed vessels in the shape of constant camber bottom/top vessels of approximately 500 feet long by 50 feet in diameter. Once filled these vessels automatically disengage and are remotely controlled to dock with offshore CNG off-loading buoys near shore.

The survivability of the invention is inherent in the design and construction. The device is designed to be able to take maximum sea conditions due to its unitized, low drag semi-submerged structure once the Array of Devices 100 meets it maximum load limits. It is designed to submerge below storm sea state. The invention uses several approaches to combat corrosion, including protective coatings, high frequency vibration and cathodic protection—attracting corrosive chemicals to electrically charged plates of a dissimilar metal, known as sacrificial anodes, by running a weak electric current through the framework. The invention is self-cleaning. Data from the output of the Energy Absorber Module 102 and Network of Sensors 125 in the hull signal when debris is impinging on performance causing the Energy Absorber Module 102 to hinge down to clear itself. Even the Energy Absorber 106 Propeller 402 blades will be cleaned with every rotation, to avoid a build-up of animal and plant life. Using solid state light emitting polymers the nighttime and low visibility exterior is programmable polymers offering numerous signage and warning lighting options. The top of each Energy Absorber 106 have two inexpensive solid state micro color cameras linked to the shore side monitors. The input of air for the compressed air system passes through a whistle mechanism at the top of a deck mounted mast causing a steady pulsing warning tone.

ADVANTAGES

Conclusions, Ramifications, and Scope of Invention

Thus the reader will see the invention absorbs a broad spectrum of wave energy and because it can be configured in the form of a semi-submerged array of devices it maximizes surface area thus increasing overall power output. The device is designed for both offshore and ocean siting and uses a time-tested low speed, high torque propeller to extract energy which can handle breaking waves weighing several tons. The invention utilizes rounded, non-fouling, self cleaning surfaces to repel debris and marine growth. Its low speed, rounded surfaces and minimal anchor cables provide safety for wildlife. The device is self righting and submerges below storm conditions. It has minimum parts to reduce costs and breakdowns. The device is composed of mostly available parts. The invention minimizes internal, inertial/mass and surface frictions. It is easy to install on site and to remove for annual service. The device does not have a complicated electric system. It can be situated either offshore in 200+ feet depth or in highest energy areas of the open ocean.

While my above descriptions contains specificities, these should not be construed as limitations on the scope of the invention, but rather as an exemplification of one preferred embodiment thereof. Many other variations are possible. For example . . .

An alternate embodiment is to place the stabilizer tubes behind the focuser and energy absorber systems. In this configuration a streamlined ballast tank is added to the rear of the stabilizer tubes to help counteract the mass of the focuser and energy absorber systems.

An alternate embodiment is an open ocean version which directs the compressed air to streamlined floating pods which also hold up the anchoring tackle. Here the compressed air drives a reverse osmosis desalinator converting the sea water into fresh water which is then pumped into an electrolyzer powered by an air pressure driven turbine electric generator. This is used to split the water into hydrogen where it is liquefied and distributed back to detachable storage pods for shipment to the coast by towage.

An alternate embodiment is to use the compressed air coming from underwater lines from the offshore array of devices to directly drive onshore Reverse Osmosis water making systems which is more energy efficient than using electric pumps.

An alternate embodiment is to employ Broadband that can be used over power lines (BPL) technology which allows the offshore version of the invention to send all monitoring and control feedback to onshore systems anywhere in the world via the internet.

An alternate embodiment places a Barge Board every 25 feet along the length of the Focuser to strengthen it and divert the wave energy into the Energy Absorbers.

An alternate embodiment is to replace the use of steel plate and tubing with high strength composite polymer materials.

In an alternate embodiment the Focuser can be composed of aluminum plates sealed from the seawater with polymer coatings.

In an alternate embodiment of the Energy Absorber used to absorb the impact of the collapsing wave by compressing a one piece air bladder 700 which is sandwiched between the Focuser and a flexible panel 223. Thus the tons of water that cascade over the Ocean Energy Modules compress the air bladder 700 which blows air through a self-rectifying turbine placed inside the bladder 700 thus generating electricity which is stored in an ultra-capacitor and then sent through underground cable to a shore side electrical hookup.

In an alternate embodiment, the Focuser, Stabilizer Tubes and Front and Rear Buoyancy Tubes are composed of standard marine grade fiberglass which can be cost effectively and rapidly molded using female and male low pressure molds. The curved shape along with the fiberglass and internal foam core makes the entire unit strong and light.

In an alternate embodiment the Energy Absorber absorbs the breaking ocean waves kinetic energy and converts it into electricity through the use of large spiral floating screws which are attached at their ends to semi-flexible rotating prop shafts that lead to sealed permanent magnet electric generators mounted on gimbals behind the tower/struts.

In an alternate embodiment the Ocean Energy Module can be built up to 1,000 feet wide and 100 feet long.

In an alternate embodiment the Ocean Energy Module can be scaled down for lower energy density sites including an approximate 250 kW unit and a 500 kW unit.

In an alternate embodiment the shape of the Focuser can be altered using leading and trailing edge flaps.

In an alternate embodiment the surface of the Focuser can be enhanced to induce more or less drag with the use of foils, dimples, riblets and other micro shapes.

In an alternate embodiment various approaches can be used to keep the large surface clean including ecological anti-fouling and silicon paints.

In an alternate embodiment large scale thermoforming can replace injection molding, fiberglass lay-up and compression molding for large scale parts. These thermoformable resins reduce manufacturing costs, offer molded in decration, and are weather proof, scratch resistant and impact resistant.

In an alternate embodiment each Energy Absorber can automatically reshape and retune itself for ever changing wave size and duration via the flexible characteristics molded into the composite material.

In an alternate embodiment the Propellers can be designed to eliminate fouling, reduce marine growth and deal with ocean borne debris.

In an alternate embodiment the propeller is replaced by a vertical fish tail shaped configuration. Recent studies have found that the cantilevered wing section in birds and fish is more energy efficient than the propeller used by humans. The tower/strut is the leading edge of a wing with a hinged aft section and trailing ailerons for trim. The back and forth action will pull power out of each passing breaking wave. It will be silent and non-fouling.

In an alternate embodiment the Focuser is a properly designed compliant mechanisms well-suited for shape morphing applications, including adaptive structures on aircraft to allow the ability to twist, or change deflection, over the span.

In an alternative design the Energy Absorber drives a permanent magnet generator attached to the base of the tower/strut sending electricity via high power underwater cable onshore to the main power grid. Permanent magnet generators need no gearbox thereby reducing both losses in power and maintenance costs significantly.

In an alternative configuration the Propeller is replaced by a horizontal whale tail configuration. The locomotion of most creatures that fly or swim can be characterized by a single mathematical proportion called the Strouhal number-the ratio between an animals cruising speed and the rate at which it flaps its wings or swishes its tail. This number dictates how efficiently an animal moves through air or water by predicting how its body interacts with the vortices it creates through its propulsion. In the cases of a selection of flying animals the strouhal number was 0.3 and that is the same number for tail propelled aquatic creatures like dolphins and sharks and other fish. Animals that developed independently following the same geometry. This whale tail can activate an air pump at its base as it sweep up and down through the passing breaking wave.

In an alternative design is to have shorter sections of approximately 500 feet locked together on one long structure. These array of devices harvest a balanced amount of the wave front thus not destabilizing each wave front like other wave energy converters do. This allows the wave front to continue as undisturbed as possible and reform creating the possibility of stacking several more lines of array of devices behind it.

An alternative design is the use of a short large diameter spring to connect the units, allowing for the twisting and flexing of the joint and absorbs the compression forces between the two sections.

In an alternative configuration the propeller is replaced by a flexible membrane tail. The Energy Module is an arrangement of six tails with exposed airbags mounted around the side spine of each. As waves impact on the structure air is forced between the six bags via the hollow spine which is equipped with self-rectifying turbines. The waves surging against a flexible membrane in the face of each chamber alternately compress and expand the air inside, driving air turbines.

In an alternative configuration the Focuser is ballasted with water.

In an alternative configuration the Focuser and Energy Absorbers support tubes can be attached to a common centerboard which slides up and down through the main hull controlled by hydraulic pressure thus changing the depth of the apparatus for changing wave conditions.

In an alternative configuration the Focuser can be designed with various shapes, lengths, widths, curves, and materials.

In an alternative configuration the Stabilizer Tubes can be designed with various shapes, lengths, widths, curves, and materials.

In an alternative configuration the Front and Rear Buoyancy Tubes can be designed with various shapes, lengths, widths, curves, and materials.

I claim:

1. An ocean energy module for converting ocean energy into useful energy comprising:
   a. a focuser comprising a surface having a leading edge and a lateral edge shaped to condense and amplify ocean wave energy, wherein the leading edge is at least 30 feet below the surface of the water and the trailing edge is from two feet above to two feet below the surface of the water, wherein the surface is generally at an angle of 45 degrees near the leading edge, horizontal near the trailing edge, and curved therebetween;
   b. a stabilizer member connected to the focuser to provide support to the focuser;
   c. an unenclosed energy absorber unit positioned near the trailing edge of the focuser to convert wave energy to compressed air while allowing the rear of the energy absorber to exhaust a spent wave quickly causing the least distortion of a passing pressure wave which allows the pressure wave to reform quickly with minimum energy loss.

2. The ocean energy module of claim 1, wherein the energy absorber unit is positioned generally upright.

3. The ocean energy module of claim 1, wherein the energy absorber unit is rotatable backwardly and away from to an incoming wave about a generally horizontal axis in order to shed any excessive energy of the oncoming wave.

4. The ocean energy module of claim 1, wherein
   a. the leading edge further comprises a front buoyancy member, wherein the front buoyancy member can be adjusted to change the height of the leading edge and
   b. the trailing edge further comprises a rear buoyancy member, wherein the rear buoyancy member can be adjusted to change the height of the trailing edge, wherein changing the height of the leading edge and/or the trailing edge adjusts an angle of the focuser.

5. The ocean energy module of claim 1, wherein the focuser is ballasted with water.

6. The ocean energy module of claim 1, wherein the energy absorber unit comprises a constantly changing programmable solid state suspension to provide a high torque characteristic of the propeller.

7. The ocean energy module of claim 1, wherein the energy absorber unit is made from high strength composite.

8. The ocean energy module of claim 1, wherein the stabilizer tube is positioned behind the focuser and the energy absorber unit.

9. The ocean energy module of claim 1 further comprising
   a. a high pressure hose that carries the compressed air away from the energy absorber unit and
   b. an air turbine generator that converts the compressed air into electrical energy.

10. The ocean energy module of claim 1 further comprising
    a. a slack mooring system to secure the module, wherein the mooring system comprises a mooring cable and a submerged float to support the majority of the weight of the mooring cable;
    b. an onboard computer; and
    c. an electro-pneumatic controller controlled by the onboard computer to adjust the height of the leading edge of the focuser.

11. A method for converting ocean wave energy into usable electrical energy comprising:
    a. creating a surging breaker wave by slowing the forward movement of an ocean pressure wave as it approaches a plurality of energy absorber units, wherein the step of creating a surging breaker wave comprises engaging the ocean pressure wave with a focuser with a surface, a leading edge, and a trailing edge; said surface having a slope of 45 degrees near the leading edge, a slope approaching zero degrees near the trailing edge, and curved therebetween; said leading edge lying at least 30 feet below the ocean surface, and said trailing edge lying from zero to two feet below the ocean surface;
    b. directing the surging breaker wave through the energy absorber units while exhausting a spent surging breaker wave quickly causing the least distortion of the ocean pressure wave which allows the ocean pressure wave to reform quickly with minimum energy loss;
    c. converting energy from the surging breaker wave into compressed air;
    d. carrying the compressed air to one or more turbine generators; and
    e. converting pneumatic energy from the compressed air to electrical energy.

12. The method of claim 11 further comprising: adjusting the angle of the focuser by adjusting the contents of buoyancy members positioned near the leading and trailing edges of the focuser.

13. The method of claim 12 wherein the contents of the buoyancy members includes water and air.

14. The method of claim 11 wherein the energy absorber units are generally upright.

15. The method of claim 11 wherein the energy absorber units are rotatable backwardly and away from an incoming wave about a generally horizontal axis in order to shed any excessive energy of the wave.

16. The method of claim 11 further comprising accumulating and combining the compressed air from a plurality of the energy absorber units to smooth out the cyclical nature of the ocean wave energy.

17. A network of two or more ocean energy modules for converting ocean energy into useful energy using naturally occurring processes to amplify, condense and convert ocean's kinetic energy, each module comprising:
    a. a focuser comprising a surface having a leading edge and a trailing edge shaped to condense and amplify ocean wave energy, wherein the surface comprises a slope of approximately 45 degrees in the front half and an approximately horizontal section near the trailing edge, the leading edge comprises a front buoyancy member, wherein the front buoyancy member can be adjusted to change the height of the leading edge and is at least approximately 30 feet below the surface of the water and the trailing edge comprises a rear buoyancy member, wherein the rear buoyancy member can be adjusted to change the height of the trailing edge and is from approximately zero feet to approximately two feet below the surface of the water and wherein the focuser is ballasted with water;
    b. one or more stabilizer members connected to the focuser to provide support to the focuser;
    c. an energy absorber unit constructed of high strength composite positioned near the trailing edge of the focuser to convert wave energy to compressed air, wherein the energy absorber unit is positioned generally upright but can rotate back and away from an oncoming wave about a generally horizontal axis in order to shed any excessive energy of the oncoming wave and wherein the energy absorber unit comprises a high torque characteristic through constantly changing programmable solid state suspension;
    d. a high pressure hose that carries the compressed air away from the energy absorber unit; and
    e. an air turbine generator that converts the compressed air into electrical energy.

18. An array of interconnected ocean energy conversion devices for converting large areas of ocean waves into useful energy comprising:
    a. a plurality of ocean energy modules deployed so as to intercept ocean energy and direct said ocean energy to a plurality of unenclosed absorber units, wherein each ocean energy module is attached to an adjacent ocean energy module through a flexible coupling between a focuser and a first stabilizer tube and a fixed attachment to a second stabilizer tube;
    b. a plurality of air compressors, wherein each air compressor is connected to a high pressure hose through a one way valve, wherein the high pressure hose connects through the plurality of ocean energy modules to accumulate air pressure from the plurality of air compressors;
    c. a mooring to the ocean bottom approximately every 1,000 feet of array;
    d. an underwater transmission system to shore;
    wherein the focuser comprises a surface having a leading edge and a lateral edge shaped to condense and amplify ocean wave energy, wherein the leading edge is at most approximately 30 feet below the surface of the water and the trailing edge is from approximately two feet above to approximately two feet below the surface of the water, wherein the surface is generally at an angle of 45 degrees near the leading edge, horizontal near the trailing edge, and curved therebetween.

* * * * *